(12) United States Patent
Mudring et al.

(10) Patent No.: US 10,029,920 B2
(45) Date of Patent: Jul. 24, 2018

(54) SEPARATION OF TERBIUM(III,IV) OXIDE

(71) Applicant: Iowa State University Research Foundation, Inc., Ames, IA (US)

(72) Inventors: Anja-Verena Mudring, Ames, IA (US); Denis Prodius, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 78 days.

(21) Appl. No.: 15/185,075

(22) Filed: Jun. 17, 2016

(65) Prior Publication Data
US 2017/0022071 A1    Jan. 26, 2017

Related U.S. Application Data

(60) Provisional application No. 62/184,664, filed on Jun. 25, 2015.

(51) Int. Cl.
| | |
|---|---|
| *C22B 59/00* | (2006.01) |
| *C01F 17/00* | (2006.01) |
| *C01B 25/26* | (2006.01) |
| *C22B 3/06* | (2006.01) |
| *C22B 3/44* | (2006.01) |

(52) U.S. Cl.
CPC .......... *C01F 17/0043* (2013.01); *C01B 25/26* (2013.01); *C22B 3/06* (2013.01); *C22B 3/44* (2013.01); *C22B 59/00* (2013.01); *C01P 2002/70* (2013.01); *C01P 2002/85* (2013.01); *C01P 2004/60* (2013.01); *C01P 2004/61* (2013.01); *C01P 2004/62* (2013.01); *C01P 2004/64* (2013.01); *C01P 2004/82* (2013.01); *Y02P 10/234* (2015.11)

(58) Field of Classification Search
CPC ...... C01F 17/0043; C22B 3/165; C22B 59/00
USPC ................................................ 423/21.1, 263
See application file for complete search history.

(56) References Cited

U.S. PATENT DOCUMENTS

| | | | |
|---|---|---|---|
| 3,468,622 A | 9/1969 | Pobiner | |
| 3,554,693 A * | 1/1971 | Orlandini et al. | ... C01F 17/0006 423/21.5 |
| 3,702,233 A * | 11/1972 | Gump et al. | .......... C22B 359/00 423/21.1 |
| 4,647,438 A | 3/1987 | Sabot et al. | |
| 7,976,798 B2 | 7/2011 | Otto et al. | |
| 2009/0162267 A1 | 6/2009 | Otto et al. | |
| 2014/0166788 A1 | 6/2014 | Pearse et al. | |

FOREIGN PATENT DOCUMENTS

| | | |
|---|---|---|
| CN | 1042570 A | 5/1990 |
| WO | WO-2011/106167 A1 | 9/2011 |
| WO | WO-2013/177729 A1 | 12/2013 |
| WO | WO-2014/144463 A1 | 9/2014 |

OTHER PUBLICATIONS

Gasgnier et al, "Selective leaching . . . acoustic emission" Comptes Rendus de l'Academie des Sciences, Serie IIb: Mecanique, Physique, Chimie, Astronomie, 1994, 318(7), pp. 915-920. (Year: 1994).*
Abstract of CN 101348274A, Jan. 2009. (Year: 2009).*
Otsuki, Akira, et al., "Separation of rare earth fluorescent powders by two-liquid flotation using organic solvents", *Jpn. J. Appl. Phys.*, 47 (6), (2008), 5093-5099.
Schuler, Doris, et al., "Study on Rare Earths and Their Recycling", *Final Report for the Greens/EFA Group in the European Parliament*, (Jan. 2011), 162 pgs.
Yan, Chunhua, et al., "Rare Earth Separation in China", *Tsinghua Science and Technology*, 11(2), (Apr. 2006), 241-247.

* cited by examiner

*Primary Examiner* — Steven J Bos
(74) *Attorney, Agent, or Firm* — Schwegman Lundberg & Woessner, P.A.

(57) ABSTRACT

Various embodiments relate to separation of terbium(III,IV) oxide. In various embodiments, present invention provides a method of separating terbium(III,IV) oxide from a composition. The method can include contacting a composition including terbium(III,IV) oxide and one or more other trivalent rare earth oxides with a liquid including acetic acid to form a mixture. The contacting can be effective to dissolve at least some of the one or more other trivalent rare earth oxides into the liquid. The method can include separating undissolved terbium(III,IV) oxide from the mixture, to provide separated terbium(III,IV) oxide.

20 Claims, 3 Drawing Sheets

SEPARATION OF TERBIUM(III,IV) OXIDE

CROSS-REFERENCE TO RELATED APPLICATION

This application claims the benefit of priority to U.S. Provisional Patent Application Ser. No. 62/184,664 filed Jun. 25, 2015, the disclosure of which is incorporated herein in its entirety by reference.

STATEMENT OF GOVERNMENT SUPPORT

This invention was made with Government support under Contract No. DE-AC02-07CH11358 awarded by the Department of Energy. The U.S. Government has certain rights in this invention.

BACKGROUND

Because of their geochemical properties, rare earth elements (REEs) are typically dispersed and not often found concentrated as rare earth minerals in economically exploitable ore deposits. It was the very scarcity of these minerals that led to the term "rare earth." Some of the major end uses for rare earth elements (REEs) include catalysis, permanent magnets and rechargeable batteries for hybrid and electric vehicles, phosphors in lighting and flat panel displays (e.g., cell phones, portable DVD players, laptops), generators for wind turbines, numerous medical devices, and many other applications in the fast growing green energy and high tech market segments. In 2010, the U.S. Department of Energy classified several REEs critical to these markets to be in short supply, including yttrium (Y) and lanthanides including terbium (Tb), neodymium (Nd), europium (Eu), and dysprosium (Dy). China, the world's largest REE supplier, controlling about 95% of the market, has declared that China's heavy REEs (including Y and lanthanides Eu, Tb, and Dy) could be depleted in the next 15-20 years.

Lanthanides are usually obtained mixed together from ore concentrate and are problematic to separate due to their well-pronounced chemical similarity. Classical separation techniques are time consuming, require elaborate multistage processing sequences, and use expensive (and generally hazardous) reagents which can contaminate the product and the environment. Industrially, the REEs usually are recovered from the leach liquor by solvent extraction with 25% di-(2-ethylhexyl)phosphoric acid (D2EHPA) in kerosene, followed by multistage pulling of the rare earths from the organic solution and precipitation with oxalic acid. The final step is calcination and transformation of the rare earth oxalates into oxides. Less than 1% of the REEs are recycled from end-of-life products mainly due to the complexity of these methods involving large-scale use of hazardous chemicals (e.g., organophosphorous reagents) and inefficient recycling routes.

SUMMARY OF THE INVENTION

In various embodiments, the present invention provides a method of separating terbium(III,IV) oxide from a composition. The method includes contacting a composition including terbium(III,IV) oxide and one or more other trivalent rare earth oxides with a liquid including acetic acid to form a mixture. The contacting is effective to dissolve at least some of the one or more other trivalent rare earth oxides into the liquid. The method includes separating undissolved terbium(III,IV) oxide from the mixture, to provide separated terbium(III,IV) oxide.

In various embodiments, the present invention provides a method of separating terbium(III,IV) oxide from a composition. The method includes contacting a composition including terbium(III,IV) oxide and one or more other trivalent rare earth oxides with a liquid including at least about 10 vol % acetic acid to form a mixture. The composition has a particle size of about 50 nm to about 500 nm. The method includes heating the mixture. The contacting and heating is effective to dissolve at least some of the one or more other trivalent rare earth oxides into the liquid. The method includes separating undissolved terbium(III,IV) oxide from the mixture, to provide separated terbium(III,IV) oxide. The yield of the separated terbium(III,IV) oxide, based on the total amount of the terbium(III,IV) oxide in the composition including terbium(III,IV) oxide, is about 50% to about 90%.

In various embodiments, the method of the present invention provides certain advantages over other methods of separating terbium(III,IV) oxide ($Tb_4O_7$), at least some of which are unexpected. For example, in various embodiments, the present method can produce terbium oxide having a similar or higher purity than other methods. In various embodiments, the present method can be performed more quickly than other methods. In various embodiments, the present method can be more cost effective than other methods. In various embodiments, the acetic acid used in the present method can be less expensive than reagents needed to perform other methods of separating terbium(III,IV) oxide. In various embodiments, the present method can be performed with microwave heating, which can be less expensive and faster than solvent extraction methods for separations. In various embodiments, the present method can be more environmentally friendly than other methods, such as having less or no omission of hazardous chemicals, being water-based, and with little or no waste generation. In various embodiments, lanthanide acetates obtained using the method can be calcined to provide corresponding lanthanide oxides. In various embodiments, the combination of simplicity, speed, low cost, and environmental friendliness, can make recycling of terbium from products at their end-of-life more practical.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
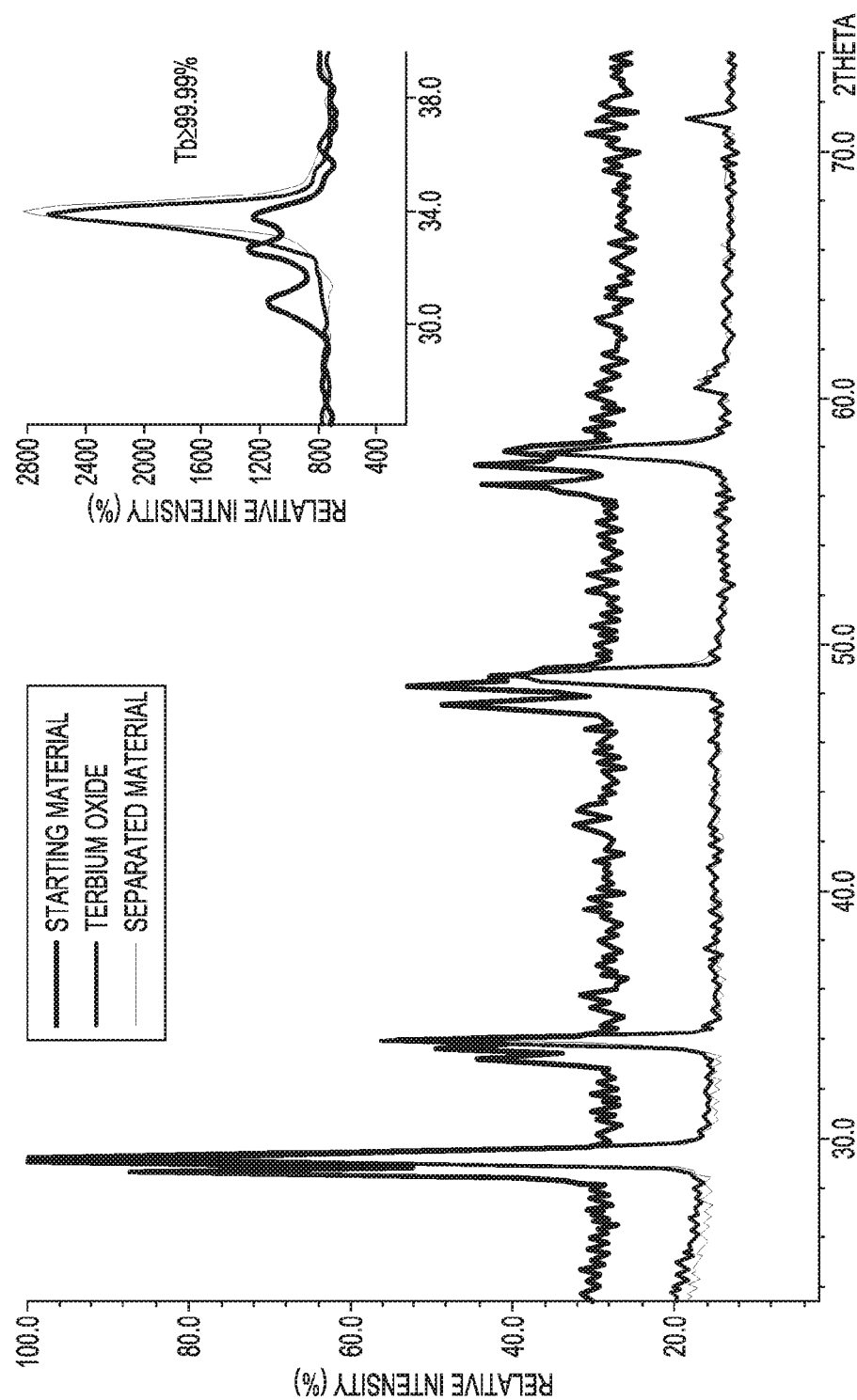
FIG. 1 illustrates a powder X-ray diffraction (PXRD) pattern of starting material and separated $Tb_4O_7$, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. All publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "solvent" as used herein refers to a liquid that can dissolve a solid, liquid, or gas. Non-limiting examples of solvents are silicones, organic compounds, water, alcohols, ionic liquids, and supercritical fluids.

The term "air" as used herein refers to a mixture of gases with a composition approximately identical to the native composition of gases taken from the atmosphere, generally at ground level. In some examples, air is taken from the ambient surroundings. Air has a composition that includes approximately 78% nitrogen, 21% oxygen, 1% argon, and 0.04% carbon dioxide, as well as small amounts of other gases.

The term "room temperature" as used herein refers to a temperature of about 15° C. to 28° C.

In various embodiments, salts having a negatively charged counterion can include any suitable negatively charged counterion. For example, the counterion can be a halide, such as fluoride, chloride, iodide, or bromide. In other examples, the counterion can be nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate. The counterion can be a conjugate base of any carboxylic acid, such as acetate or formate. In some embodiments, a counterion can have a negative charge greater than −1, which can in some embodiments complex to multiple ionized groups, such as oxide, sulfide, nitride, arsenate, phosphate, arsenite, hydrogen phosphate, sulfate, thiosulfate, sulfite, carbonate, chromate, dichromate, peroxide, or oxalate.

Method of Separating Terbium(III,IV) Oxide from a Composition

In various embodiments, the present invention provides a method of separating terbium(III,IV) oxide (i.e., $Tb_4O_7$, or tetraterbium heptaoxide) from a composition. The method can include contacting a composition including terbium(III, IV) oxide and one or more other trivalent rare earth oxides with a liquid including acetic acid to form a mixture. The contacting can be effective to dissolve at least some of the one or more other trivalent rare earth oxides into the liquid. The method also includes separating undissolved terbium (III,IV) oxide from the mixture, to provide separated terbium(III,IV) oxide.

The liquid including acetic acid can be any suitable liquid that includes acetic acid. The liquid including acetic acid can be substantially pure acetic acid (e.g., 100 vol % acetic acid, or glacial acetic acid). The liquid including acetic acid can be an aqueous liquid including acetic acid (e.g., some or all of the remainder of the liquid can be water). The liquid including acetic acid can include water miscible solvents, such as acetone, dimethylsulfoxide, dimethylformamide, alcohols such as methanol or ethanol, or a combination thereof. The liquid including acetic acid can be about 0.01 vol % to about 100 vol % acetic acid, about 10 vol % to about 30 vol %, about 15 vol % to about 25 vol %, or about 0.01 vol % or less, or about 0.1 vol %, 1, 2, 3, 4, 5, 6, 8, 10, 12, 14, 15, 16, 17, 18, 19, 20, 21, 22, 23, 24, 25, 26, 27, 28, 29, 30, 32, 34, 36, 38, 40, 45, 50, 55, 60, 65, 70, 75, 80, 85, 86, 88, 90, 92, 94, 95, 96, 97, 98, 99, 99.9, 99.99, or about 99.999 vol % acetic acid or more.

Separating the undissolved terbium(III,IV) oxide from the mixture can include removing at least some of the liquid having at least some of the one or more other trivalent rare earth oxides therein from the undissolved terbium(III,IV) oxide. Separating the undissolved terbium(III,IV) oxide from the mixture can include removing an undissolved composition that includes terbium(III,IV) oxide and that can optionally include (e.g., can include or can be free of) one or more other undissolved materials, such as elemental terbium, a terbium alloy, a complex terbium oxide (e.g., a phosphate, sulfate, or carbonate), a terbium chalcogenide, a terbium halide, or a combination thereof.

The separating of the undissolved terbium(III,IV) oxide from the liquid can occur in any suitable way, such as including filtration, decantation, sedimentation, centrifugation, and the like, or a combination thereof. The separating can include washing the separated undissolved terbium(III, IV) oxide to remove residual liquid including the one or more other trivalent rare earth oxides therein, such as washing with an aqueous composition (e.g., water). The separating can include drying the separated undissolved terbium(III,IV) oxide to remove residual water or other liquids therefrom. The drying can occur at any suitable temperature, such as room temperature, or such as an elevated temperature (e.g., about 30° C. to about 1000° C., about 40° C. to about 500° C., about 50° C. to about 200° C., or about 30° C. or less, or about 40° C., 50, 60, 70, 80, 90, 100, 110, 120, 130, 140, 150, 175, 200, 225, 250, 275, 300, 350, 400, 450, 500, 600, 700, 800, 900° C., or about 1000° C. or more). The drying can occur at any suitable pressure, such as atmospheric pressure, or such as under a vacuum (e.g., about 0.001 kPa to about 100 kPa, about 0.1 kPa to about 50 kPa, or about 0.001 kPa or less, or about 0.005 kPa, 0.01, 0.05, 0.1, 0.5, 1, 5, 10, 20, 30, 40, 50, 60, 70, 80, 90 kPa, or about 100 kPa). The drying can occur in any suitable ambient environment, such as in air, or such as in an inert environment.

Heating

The contacting of the composition including terbium(III, IV) oxide and one or more other trivalent rare earth oxides with a liquid including acetic acid to form a mixture can be performed at any suitable temperature. The contacting can include contacting at room temperature or ambient temperature. The contacting can include heating the mixture.

Heating the mixture can occur at any suitable time during the contacting. The contacting can be initiated prior to the heating, such that the mixture is formed prior to the heating. The contacting can be initiated after the heating, such the liquid including acetic acid, the composition including terbium(III,IV) oxide, or both, are heated prior to the formation of the mixture. The combination of the contacting and the heating can be effective such that at least some of the other trivalent rare earth oxides in the composition including terbium(III,IV) oxide are dissolved into the liquid including acetic acid.

The heating can be performed in any suitable manner. For example, the heating can include exposing to a suitable form of radiation (e.g., energetic particles travelling through a medium or space, such as visible light, infrared light, microwaves, radio waves, very low frequency waves, extremely low frequency waves, thermal radiation (heat), and black-body radiation). The heating can include heating the mixture with microwaves. Any suitable total power of microwaves can be used, such as about 0.001 W to about 100,000,000 W, about 50 W to about 200 W, or about 0.001 W or less, or about 0.01 W, 0.1, 1, 2, 3, 4, 5, 10, 15, 20, 30, 40, 50, 60, 70, 80, 90, 100, 110, 115, 120, 125, 130, 135, 140, 145, 150, 160, 170, 180, 190, 200, 225, 250, 275, 300, 350, 400, 450, 500, 750, 1,000, 5,000, 10,000, 25,000, 50,000, 100,000, 500,000, 1,000,000, 50,000,000 W, or about 100,000,000 W or more. Any suitable power of microwaves per volume of the liquid including acetic acid can be used, such as about 0.001 W/mL to about 100,000,000 W/mL, about 50 W/mL, to about 200 W/ML, or about 0.001 W/mL or less, or about 0.01 W/mL, 0.1, 1, 2, 3, 4, 5, 10, 15, 20, 30, 40, 50, 60, 70, 80, 90, 100, 110, 115, 120, 125, 130, 135, 140, 145, 150, 160, 170, 180, 190, 200, 225, 250, 275, 300, 350, 400, 450, 500, 750, 1,000, 5,000, 10,000, 25,000, 50,000, 100,000, 500,000, 1,000,000, 50,000,000 W/mL, or about 100,000,000 W/mL or more. The application of microwaves can occur for any suitable time period, such as for about 0.001 s to about 10 days, about 0.1 s to about 10 min, about 1 s to about 1 min, or about 0.001 s or less, or about 0.01 s, 0.1, 1, 2, 3, 4, 5, 10, 15, 20, 25, 30, 35, 40, 45, 50, 55 s, 1 min, 2, 3, 4, 5, 10, 15, 20, 25, 30, 35, 40, 45, 50, 55 min 1 h, 2, 3, 4, 5, 6, 7, 8, 9, 10, 15, 20 h, 1 day, 2 days, 3, 4, 5, 6, 7, 8, 9, or 10 days or more.

The heating can include heating the mixture to any suitable heated temperature. The heated temperature can be about 30° C. to about 2000° C., about 100° C. to about 200° C., or about 30° C. or less, or about 40° C., 50, 60, 70, 80, 90, 100, 110, 120, 130, 140, 150, 160, 170, 180, 190, 200, 220, 240, 260, 280, 300, 325, 350, 375, 400, 450, 500, 600, 700, 800, 900, or about 1000° C. or more. The heating can be performed at any suitable pressure, such as about atmospheric pressure, or about 100 kPa to about 50 MPa, or about 100 kPa or less, or about 125 kPa, 150, 175, 200, 250, 300, 350, 400, 500, 750 kPa, 1 MPa 3, 4, 5, 10, 15, 20, 25 MPa, or about 50 MPa or more. The heating can be performed in any suitable environment, such as in air or an inert environment. Once the heated temperature is obtained, the mixture can be allowed to immediately cool, or the heated temperature can be substantially maintained for a suitable duration of time (e.g., until a desired amount of the other trivalent rare earth oxides have been dissolved into the liquid including acetic acid). The heating can include maintaining the heated temperature for about 0.001 s to about 10 days, about 0.1 s to about 10 min, about 1 s to about 1 min, or about 0.001 s or less, or about 0.01 s, 0.1, 1, 2, 3, 4, 5, 10, 15, 20, 25, 30, 35, 40, 45, 50, 55 s, 1 min, 2, 3, 4, 5, 10, 15, 20, 25, 30, 35, 40, 45, 50, 55 min, 1 h, 2, 3, 4, 5, 6, 7, 8, 9, 10, 15, 20 h, 1 day, 2 days, 3, 4, 5, 6, 7, 8, 9, or 10 days or more.

After the heating (e.g., after the heating, or after the heating and maintaining of the heated temperature), the method can include cooling the mixture. The cooling can be passive cooling (e.g., allowing the mixture to cool) or active cooling (e.g., using a cooling device to cool the mixture more quickly). In some embodiments, the method can include perforating the heating, maintaining (if performed), and cooling more than one time.

Composition Including Terbium(III,IV) Oxide

The composition including terbium(III,IV) oxide can include any suitable amount of terbium(III,IV) oxide, provided the method can be performed as described herein. For example, about 0.01 wt % to about 99.999 wt % of the composition can be terbium(III,IV) oxide, or about 10 wt % to about 50 wt %, or about 0.01 wt % or less, or about 0.05 wt %, 0.1, 0.5, 1, 2, 3, 4, 5, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 91, 92, 93, 94, 95, 96, 97, 98, 99, 99.9, 99.99, or about 99.999 wt % or more.

The one or more other trivalent rare earth oxides can be present in the composition in any suitable relationship with the terbium(III,IV) oxide, such as a homogeneous mixture or a heterogeneous mixture. The one or more other trivalent rare earth oxides can be any suitable one or more trivalent rare earth oxides, such that the method can be carried out as described herein. For example, the one or more other trivalent rare earth oxides can include yttrium oxide ($Y_2O_3$), praseodymium oxide ($Pr_2O_3$), neodymium oxide ($Nd_2O_3$), samarium oxide ($Sm_2O_3$), europium oxide ($Eu_2O_3$), gadolinium oxide ($Gd_2O_3$), holmium oxide ($Ho_2O_3$), erbium oxide ($Er_2O_3$), ytterbium oxide ($Yb_2O_3$), lutetium oxide ($Lu_2O_3$), scandium oxide ($Sc_2O_3$), thulium oxide ($Tm_2O_3$), dysprosium oxide ($Dy_2O_3$), lanthanum oxide ($La_2O_3$), cerium oxide ($Ce_2O_3$), terbium oxide ($Tb_2O_3$), or a combination thereof. The one or more other trivalent rare earth oxides can include dysprosium oxide ($Dy_2O_3$), lanthanum oxide ($La_2O_3$), gadolinium oxide ($Gd_2O_3$), or a combination thereof. The one or more trivalent rare earth oxides described herein can independently form any suitable proportion of the composition, such as about 0.001 wt % to about 99.99 wt % of the composition, or about 50 wt % to about 99.999 wt %, or about 0.001 wt % or less, or equal to or less than about 0.005 wt %, 0.01, 0.05, 0.1, 0.5, 1, 2, 3, 4, 5, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 91, 92, 93, 94, 95, 96, 97, 98, 99, 99.9 wt %, or about 99.99 wt % or more.

In addition to the one or more trivalent rare earth oxides, the composition including terbium(III,IV) oxide can include any suitable one or more other materials (e.g., as a homogeneous or heterogeneous mixture). For example, the composition including terbium(III,IV) oxide can include elemental terbium, a terbium alloy, a complex terbium oxide (e.g., a phosphate, sulfate, or carbonate), a terbium chalcogenide, a terbium halide, cerium oxide ($CeO_2$), praseodymium oxide ($Pr_6O_{11}$), thorium(IV) oxide ($ThO_2$), terbium (IV) oxide ($ThO_2$), terbium fluoride ($TbF_2$), terbium fluoride ($ThF_3$), terbium fluoride ($TbF_4$), terbium bromide ($TbBr_3$), terbium chloride ($TbCl_3$), terbium iodide ($TbI_3$), terbium silicide ($TbSi_2$), terbium oxide ($Tb_4O_7$), terbium sulfide ($Tb_2S_3$), terbium selenide ($Tb_2Se_3$), terbium hydride ($TbH_2$), terbium boride ($ThB_2$), terbium telluride (TbTe), terbium nitride (TbN), terbium carbonate ($Tb_2(CO_3)_3$), monazite, xenotime, euxenite, ion-adsorption clay, bastnasite, $Tb_xDy_{1-x}Fe_{1.95}$ (x=about 0.1 to about 0.5), $Y_2O_3$:$Eu^{3+}$ (YOX), $LaPO_4$:$Ce^{3+}$,$Tb^{3+}$ (LAP), $(Gd,Mg)B_5O_{12}$:$Ce^{3+}$, $Tb^{3+}$ (CBT), $(Ce,Tb)MgA_{11}O_{19}$ (CAT), $BaMgAl_{10}O_{17}$:$Eu^{2+}$ (BAM), $(Sr,Ca,Ba,Mg)_5(PO_4)_3Cl$:$Eu^{2+}$, a Tb-containing alloy, a Tb-doped $CaF_2$, a Tb-doped $CaWO_4$, a Tb-doped strontium molybdate, sodium terbium borate, a hydrate thereof, or a combination thereof. The one or more other materials can form any suitable proportion of the composition including terbium(III,IV) oxide, such as such as about 0.001 wt % to about 99.99 wt % of the composition, or about 50 wt % to about 99.999 wt %, or about 0.001 wt % or less, or equal to or less than about 0.005 wt %, 0.01, 0.05, 0.1, 0.5, 1, 2, 3, 4, 5, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 91, 92, 93, 94, 95, 96, 97, 98, 99, 99.9 wt %, or about 99.99 wt % or more.

The composition including terbium(III,IV) oxide can have any suitable particle size. A smaller particle size can increase the total surface area of the composition and thereby facilitate contact between the one or more other trivalent rare earth oxides and the liquid including acetic acid. The composition including terbium(III,IV) oxide can have a particle size (e.g., largest particle dimension) of about 1 nm to about 100 mm, about 50 nm to about 500 nm, or about 1 nm or less, or about 2 nm, 3, 4, 5, 6, 8, 10, 15, 20, 25, 30, 40, 50, 60, 70, 80, 90, 100, 110, 120, 130, 140, 150, 160, 170, 180, 190, 200, 210, 220, 230, 240, 250, 260, 270, 280, 290, 300, 320, 340, 360, 380, 400, 425, 450, 475, 500, 600, 700, 800, 900 nm, 1 micron, 2, 3, 4, 5, 6, 8, 10, 15, 20, 25, 50, 100, 150, 200, 250, 500, 750 microns, 1 mm, 2, 3, 4, 5, 6, 7, 8, 9, 10, 15, 20, 25, 50, 75 mm, or about 100 mm or more.

Separated Terbium(III,IV) Oxide

The separated terbium(III,IV) oxide can have any suitable degree of purity of the terbium(III,IV) oxide consistent with embodiments of the method described herein. For example, the separated terbium(III,IV) oxide can be about 0.01 wt % to about 100 wt % terbium(III,IV) oxide, or about 90 wt to about 99.999 wt %, or about 0.01 wt % or less, or about 0.1 wt %, 1, 2, 3, 4, 5, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 91, 92, 93, 94, 95, 96, 97, 98, 99, 99.1, 99.2, 99.3, 99.4, 99.5, 99.6, 99.7, 99.8, 99.9, 99.95, 99.99, 99.995, or about 99.999 wt % or more.

The method can have any suitable yield of the separated terbium(III,IV) oxide, based on the total amount of the terbium(III,IV) oxide in the composition including the terbium(III,IV) oxide, such as about 1% to about 100%, about 50% to about 90%, or about 1% or less, or equal to or greater than about 2%, 3, 4, 5, 6, 8, 10, 15, 20, 25, 30, 35, 40, 45, 50, 52, 54, 56, 58, 60, 62, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.9, 99.99%, or about 99.999% or more, or about 100% (quantitative) yield.

In addition to the terbium(III,IV) oxide, the separated terbium(III,IV) oxide can include other materials. The separated terbium(III,IV) oxide can include or can be free of any one or more materials listed in this paragraph. The separated terbium(III,IV) oxide can include or be free of elemental terbium, a terbium alloy, a complex terbium oxide (e.g., a phosphate, sulfate, or carbonate), a terbium chalcogenide, a terbium halide, yttrium oxide ($Y_2O_3$), praseodymium oxide ($Pr_2O_3$), neodymium oxide ($Nd_2O_3$), samarium oxide ($Sm_2O_3$), europium oxide ($Eu_2O_3$), gadolinium oxide ($Gd_2O_3$), holmium oxide ($Ho_2O_3$), erbium oxide ($Er_2O_3$), ytterbium oxide ($Yb_2O_3$), lutetium oxide ($Lu_2O_3$), scandium oxide ($Sc_2O_3$), thulium oxide ($Tm_2O_3$), dysprosium oxide ($Dy_2O_3$), lanthanum oxide ($La_2O_3$), cerium oxide ($Ce_2O_3$), terbium oxide ($Tb_2O_3$), cerium oxide ($CeO_2$), praseodymium oxide ($Pr_6O_{11}$), thorium(IV) oxide ($ThO_2$), terbium (IV) oxide ($TbO_2$), terbium fluoride ($TbF_2$), terbium fluoride ($TbF_3$), terbium fluoride ($TbF_4$), terbium bromide ($TbBr_3$), terbium chloride ($TbCl_3$), terbium iodide ($TbI_3$), terbium silicide ($TbSi_2$), terbium oxide ($Tb_4O_7$), terbium sulfide ($Tb_2S_3$), terbium selenide ($Tb_2Se_3$), terbium hydride ($TbH_2$), terbium boride ($TbB_2$), terbium telluride (TbTe), terbium nitride (TbN), terbium carbonate ($Tb_2(CO_3)_3$), monazite, xenotime, euxenite, ion-adsorption clay, bastnasite, $Tb_xDy_{1-x}Fe_{1.95}$ (x=about 0.1 to about 0.5), $Y_2O_3$:$Eu^{3+}$ (YOX), $LaPO_4$:$Ce^{3+}$,$Tb^{3+}$ (LAP), $(Gd,Mg)B_5O_{12}$:$Ce^{3+}$, $Tb^{3+}$ (CBT), $(Ce,Tb)MgA_{11}O_{19}$ (CAT), $BaMgAl_{10}O_{17}$:$Eu^{2+}$ (BAM), $(Sr,Ca,Ba,Mg)_5(PO_4)_3Cl$:$Eu^{2+}$, a Tb-containing alloy, a Tb-doped $CaF_2$, a Tb-doped $CaWO_4$, a Tb-doped strontium molybdate, sodium terbium borate, a hydrate thereof, or a combination thereof. Any one or more materials listed in this paragraph can form any suitable proportion of the separated terbium(III,IV) oxide, such as about 0.001 wt % to about 50 wt %, about 0.001 wt % to about 10 wt %, about 0.001 wt % to about 1 wt %, or about 0.001 wt % or less, or equal to or less than about 0.005 wt %, 0.01, 0.05, 0.1, 0.5, 1, 2, 3, 4, 5, 6, 7, 8, 9, 10, 12, 14, 16, 18, 20, 25, 30, 35, 40, 45, or about 50 wt % or more.

Forming the Composition Including the Terbium(III,IV) Oxide

In some embodiments, the method can include forming the composition including the terbium(III,IV) oxide. In other embodiments, the composition including the terbium(III,IV) oxide is formed prior to performing the method. Forming the composition including terbium(III,IV) oxide can include forming the composition from one or more suitable starting materials, such as a starting material including terbium, including at least one compound including terbium (e.g., terbium(III,IV) oxide or another compound including terbium), or including a combination thereof.

Forming the composition can include processing the starting material. The processing can be any suitable processing that generates a composition including terbium(III,IV) oxide that can be used in an embodiment of the method described herein. For example, the processing can include roasting, grinding, crushing, chemically extracting, solvent extracting, floatation separating, forming compounds or salts of lanthanides, calcining, thermally decomposing, or any combination thereof. Forming compounds or salts of lanthanides can includes forming compounds or salts of terbium. Forming compounds or salts of lanthanides can includes precipitating the compounds or salts of lanthanides from a solution. Forming compounds of salts of lanthanides can includes forming oxalates (e.g., via treatment with oxalic acid, $HOC(O)C(O)OH$ or $H_2C_2O_4$), hydroxides e.g., via treatment with a hydroxide salt), or a combination thereof.

The processing can include at least partially removing at least some of one or more tetravalent lanthanide compounds from the starting material, such as compounds chosen from cerium(IV) oxide ($CeO_2$), praseodymium(III,IV) oxide ($Pr_6O_{11}$), thorium(IV) oxide ($ThO_2$), terbium(IV) oxide ($ThO_2$), or a combination thereof. The removing of at least some of the one or more tetravalent lanthanide compounds from the starting material can include chemically extracting, solvent extracting, floatation separating, precipitating compounds or salts of tetravalent lanthanides, or a combination thereof.

In some embodiments, forming the composition including terbium(III,IV) oxide can include processing ore including crushing, grinding, froth flotation, or a combination thereof. The method can include separating at least some tetravalent lanthanide oxides including via chemical separation, solvent extraction, or a combination thereof. The method can include precipitating oxalates, hydroxides, or a combination thereof, of remaining lanthanides. The method can include thermally decomposing the precipitated compounds to corresponding lanthanide oxides, to provide the composition including terbium(III,IV) oxide.

In various embodiments, forming the composition including terbium(III,IV) oxide can include roasting scrap including $Tb_xDy_{1-x}Fe_{1.95}$ (x=about 0.1 to about 0.5, e.g., TERFENOL-D®, an alloy with x~0.3). The method can include dissolving the roasting product in a liquid including acid (e.g., a mineral acid such as HCl or $H_2SO_4$). The method can include precipitating oxalates of Dy and Tb from the liquid (e.g., via treatment with oxalic acid) to provide a precipitate. The method can include separating the precipitate from at least some of the Fe (e.g., Fe forms soluble oxalates). The method can include thermally converting the precipitate to a product including $Tb_4O_7$ and $Dy_2O_3$, to provide the composition including terbium(III,IV) oxide.

In some embodiments, forming the composition including terbium(III,IV) oxide includes flotation separating phosphors including $Y_2O_3:Eu^{3+}$, $LaPO_4:Ce^{3+},Tb^{3+}$, and $(Sr,Ca,Ba,Mg)_5(PO_4)_3Cl:Eu^{2+}$, to provide separated $LaPO_4:Ce^{3+},Tb^{3+}$ (e.g., using a liquid flotation process with DMF as the polar phase and heptane as the non-polar phase, as described in A. Otsuki et al., "Separation of rare earth fluorescent powders by two-liquid flotation using organic solvents", Jpn. J. Appl. Phys., 2008, 47, 5093-5099). The method can include treating the separated $LaPO_4:Ce^{3+},Tb^{3+}$ with a base (e.g., a hydroxide salt such as NaOH, optionally with heating such as to about 100° C. to about 200° C. or about 150° C.) and removing produced $Na_3PO_4$, to provide hydrated oxides. The method can include roasting the hydrated oxides. The method can include extracting the roasted hydrated oxides with a liquid including acid (e.g., a mineral acid such as HCl or $H_2SO_4$). The method can include separating insoluble $CeO_2$ from the liquid including acid. The method can include precipitating oxalates of Tb and La from the liquid including acid to provide a precipitate. The method can include thermally converting the precipitate to a product including $Tb_4O_7$ and $La_2O_3$, to provide the composition including terbium(III,IV) oxide.

Thermal conversion of precipitates to provide the composition including terbium(III,IV) oxide can occur at any suitable temperature, such as about 500° C. to about 1500° C., or about 500° C. or less, or about 600° C., 700, 800, 900, 1,000, 1,100, 1,200, 1,300, 1,400° C., or about 1,500° C. or more Starting Material Forming the composition including terbium(III,IV) oxide can include forming the composition from one or more suitable starting materials, such as a starting material including terbium, including at least one compound including terbium (e.g., terbium(III,IV) oxide or another compound including terbium), or including a combination thereof.

The starting material including terbium can include a suitable ore including at least one compound including terbium. For example, the ore can include monazite, xenotime, euxenite, ion-adsorption clay, bastnasite, or a combination thereof.

The starting material can include a Tb-containing fuel cell, a Tb-containing solid-state device, a Tb-containing actuator, a Tb-containing sonar system, a Tb-containing sensor, a Tb-containing magnetomechanical device, a Tb-containing fluorescent lamp bulb (e.g., such as a lamp bulb designed for "trichromatic" lighting), a Tb-containing TV tube, a Tb-containing biochemical probe, a Tb-containing catalyst, one or more Tb-containing components thereof, or a combination thereof.

The starting material can include yttrium oxide ($Y_2O_3$), praseodymium oxide ($Pr_2O_3$), neodymium oxide ($Nd_2O_3$), samarium oxide ($Sm_2O_3$), europium oxide ($Eu_2O_3$), gadolinium oxide ($Gd_2O_3$), holmium oxide ($Ho_2O_3$), erbium oxide ($Er_2O_3$), ytterbium oxide ($Yb_2O_3$), lutetium oxide ($Lu_2O_3$), scandium oxide ($Sc_2O_3$), thulium oxide ($Tm_2O_3$), dysprosium oxide ($Dy_2O_3$), lanthanum oxide ($La_2O_3$), cerium oxide ($Ce_2O_3$), terbium oxide ($Tb_2O_3$), cerium oxide ($CeO_2$), praseodymium oxide ($Pr_6O_{11}$), thorium(IV) oxide ($ThO_2$), terbium(IV) oxide ($TbO_2$), terbium fluoride ($TbF_2$), terbium fluoride ($TbF_3$), terbium fluoride ($TbF_4$), terbium bromide ($TbBr_3$), terbium chloride ($TbCl_3$), terbium iodide ($TbI_3$), terbium silicide ($TbSi_2$), terbium oxide ($Tb_4O_7$), terbium sulfide ($Tb_2S_3$), terbium selenide ($Tb_2Se_3$), terbium hydride ($TbH_2$), terbium boride ($TbB_2$), terbium telluride (TbTe), terbium nitride (TbN), terbium carbonate ($Tb_2(CO_3)_3$), monazite, xenotime, euxenite, ion-adsorption clay, bastnasite, $Tb_xDy_{1-x}Fe_{1.95}$ (x=about 0.1 to about 0.5), $Y_2O_3:Eu^{3+}$ (YOX), $LaPO_4:Ce^{3+},Tb^{3+}$ (LAP), $(Gd,Mg)B_5O_{12}:Ce^{3+},Tb^{3+}$ (CBT), $(Ce,Tb)MgA_{11}O_{19}$ (CAT), $BaMgAl_{10}O_{17}:Eu^{2+}$ (BAM), $(Sr,Ca,Ba,Mg)_5(PO_4)_3Cl:Eu^{2+}$, a Tb-containing alloy, a Tb-doped $CaF_2$, a Tb-doped CaWO$_4$, a Tb-doped strontium molybdate, sodium terbium borate, a hydrate thereof, or a combination thereof.

EXAMPLES

Various embodiments of the present invention can be better understood by reference to the following Examples which are offered by way of illustration. The present invention is not limited to the Examples given herein.

Example 1 (SEPTER)

Figure 2:
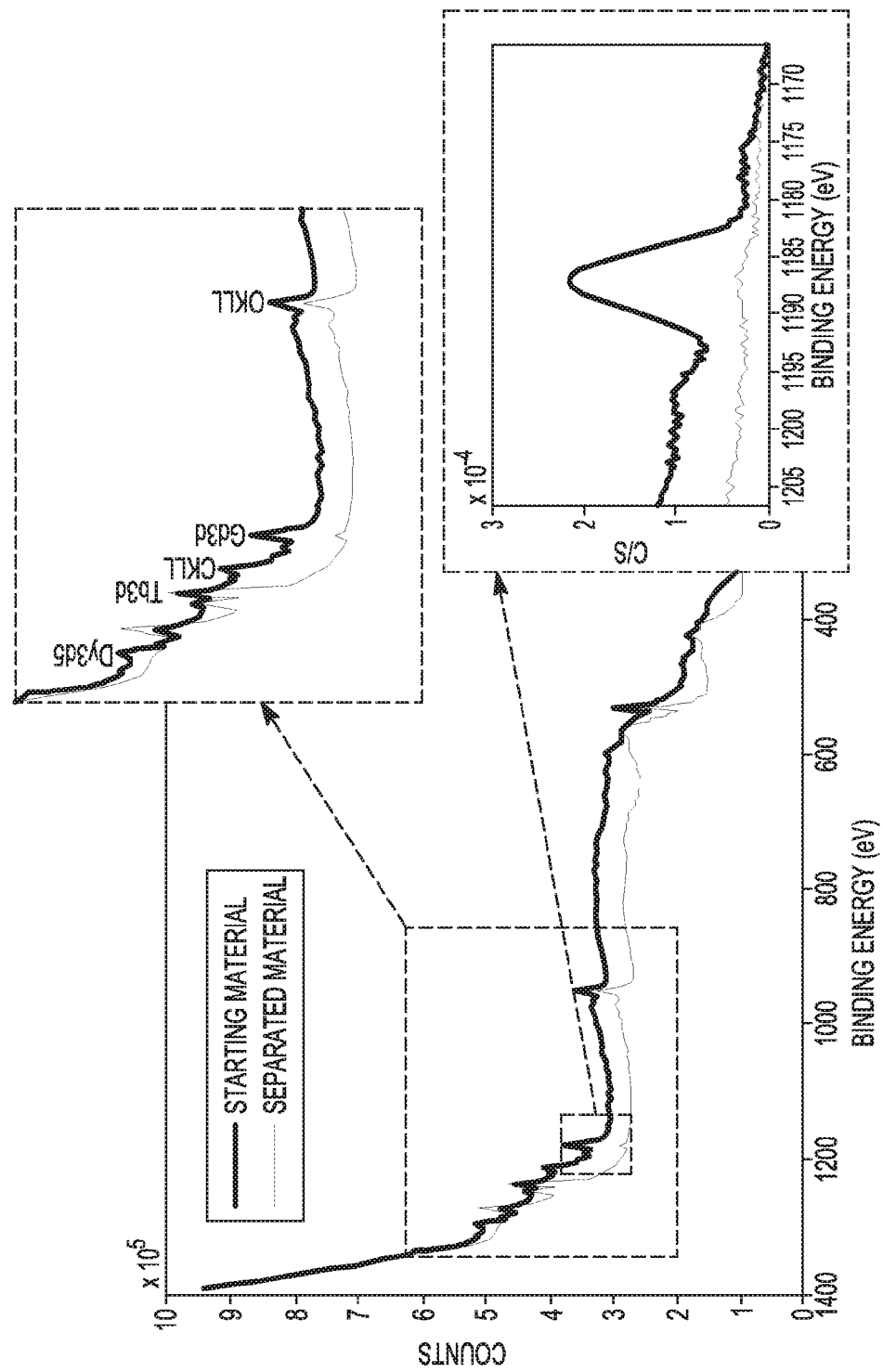
FIG. 2 illustrates an X-ray photoelectron spectrography (XPS) spectrum of starting material and separated $Tb_4O_7$, in accordance with various embodiments.

For testing our technology, the mixtures of lanthanide oxides containing Tb$_4$O$_7$ (~190-210 nm particle size), were prepared by thermal decomposition of the corresponding oxalates at 800° C. In a typical bench-scale testing, to a starting material mixture of gadolinium oxide (Gd$_2$O$_3$, 123 mg, 0.339 mmol), dysprosium oxide (Dy$_2$O$_3$, 123 mg, 0.333 mmol), and terbium(III,IV) oxide (Tb$_4$O$_7$, 123 mg, 0.165 mmol), an excess (0.8 mL, 14 mmol) of glacial acetic acid in 3 mL of water (21 vol %) was added. The mixture was stirred under microwave irradiation (125 W) and heated in a sealed 10 mL vial to 150° C., the temperature was held for 30 seconds, and then cooled to room temperature (requiring in total about 10 min). The process was repeated twice to ensure complete separation. Undissolved terbium(III,IV) oxide was then separated via centrifugation, washed several times with water, and air dried at 100° C. The minimum yield is 86.1 mg (≥70%) of ≥99.5% pure Tb$_4$O$_7$. FIG. 1 illustrates a powder X-ray diffraction (PXRD) pattern of the starting material mixture, the separated Tb$_4$O$_7$, and commercially available high purity terbium(III,IV) oxide, with the inset showing a close-up of a region. FIG. 2 illustrates an X-ray photoelectron spectrography (XPS) spectrum of the starting material mixture (top line) and the separated Tb$_4$O$_7$ (bottom line), with the two insets showing a close-ups of the region around 1197 eV at various magnifications.

Example 2. TERFENOL-D® (Hypothetical)

The technology for manufacturing the highest magnetostrictive material, TERFENOL-D®, an alloy with the composition of Tb$_x$Dy$_{1-x}$Fe$_{1.95}$ (x~0.3), was developed in the 1980s at Ames Laboratory under a U.S. Navy funded program (http://www.etrema.com/about/). Its initial application was in naval sonar systems but today is suitable also in magnetomechanical sensors, actuators, acoustic and ultrasonic transducers.

Figure 3:
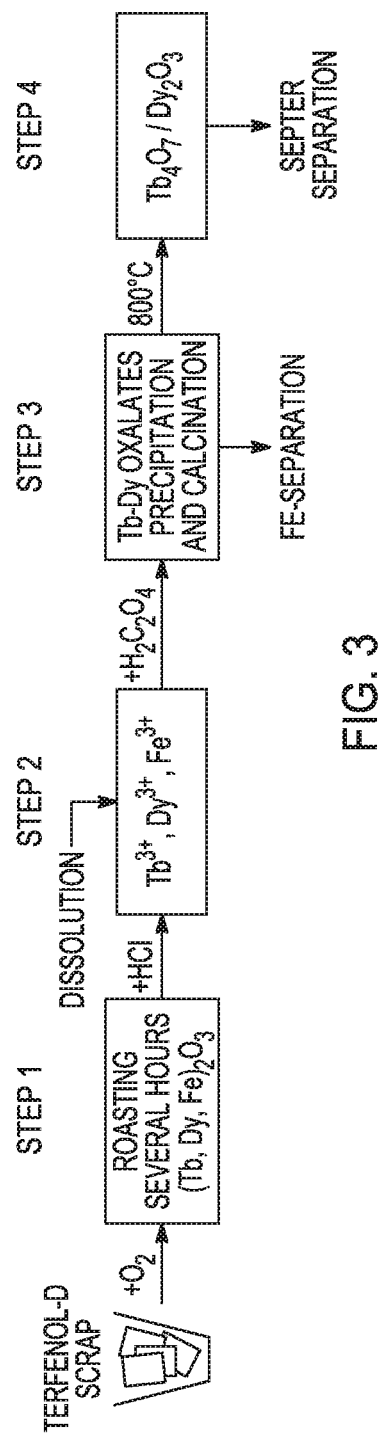
FIG. 3 illustrates a separation process, in accordance with various embodiments.

A proposed process of chemical separation includes: 1) roasting scraps of TERFENOL-D®, an alloy with the composition of Tb$_x$Dy$_{1-x}$Fe$_{1.95}$ (x~0.3), and their dissolution in diluted mineral acids (e.g. HCl); 2) separation of Tb and Dy from Fe (oxalate precipitation); 3) thermal conversion of oxalates to Tb$_4$O$_7$ and Dy$_2$O$_3$ at 800° C.; and 4) separation of Tb$_4$O$_7$ with the procedure described in Example 1. The process is illustrated in FIG. 3.

Example 3. Lamp Phosphors (Hypothetical)

Lamp phosphors in end-of-life fluorescent lamps are a rich source of the heavy rare earths elements europium, terbium, and of yttrium. Five rare earth metal-containing phosphors are often encountered in fluorescent lamps: the red phosphor Y$_2$O$_3$:Eu$^{3+}$ (YOX), the green phosphors LaPO$_4$:Ce$^{3+}$,Tb$^{3+}$ (LAP), (Gd,Mg)B$_5$O$_{12}$:Ce$^{3+}$,Tb$^{3+}$ (CBT), (Ce,Tb)MgA$_{11}$O$_{19}$ (CAT) and the blue phosphor BaMgAl$_{10}$O$_{17}$:Eu$^{2+}$ (BAM) or less commonly chloroapatite (Sr,Ca,Ba,Mg)$_5$(PO$_4$)$_3$Cl:Eu$^{2+}$.

Figure 4:
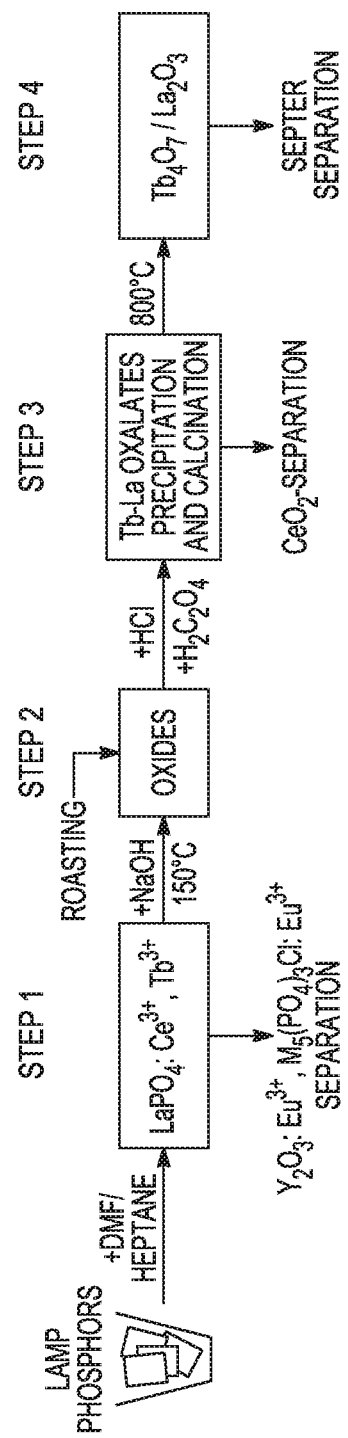
FIG. 4 illustrates a separation process, in accordance with various embodiments.

In a proposed procedure, a mixture of Y$_2$O$_3$:Eu$^{3+}$, LaPO$_4$:Ce$^{3+}$, Tb$^{3+}$ and (Sr,Ca,Ba,Mg)$_5$(PO$_4$)$_3$Cl:Eu$^{2+}$ are separated by a two-step two liquid flotation process, using N,N-dimethylformamide (DMF) as the polar phase and heptane as non-polar phase, as described in A. Otsuki et al., "Separation of rare earth fluorescent powders by two-liquid flotation using organic solvents", Jpn. Appl. Phys., 2008, 47, 5093-5099. Separated LaPO$_4$:Ce$^{3+}$,Tb$^{3+}$ can then be treated with NaOH at 150° C. to remove phosphate as Na$_3$PO$_4$, leaving a mixture of the hydrated oxides. Roasting and followed by extraction with HCl results in separation of insoluble CeO$_2$ from the TbCl$_3$/LaCl$_3$ aqueous solution. Then oxalate precipitation is performed, followed by thermal conversion to the corresponding oxides (Tb$_4$O$_7$ and La$_2$O$_3$) at 800° C., followed by the procedure described in Example 1 The process is illustrated in FIG. 4.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of separating terbium (III,IV) oxide from a composition, the method comprising:
contacting a composition comprising terbium(III,IV) oxide and one or more other trivalent rare earth oxides with a liquid comprising acetic acid to form a mixture, wherein the contacting is effective to dissolve at least some of the one or more other trivalent rare earth oxides into the liquid; and
separating undissolved terbium(III,IV) oxide from the mixture, to provide separated terbium(III,IV) oxide.

Embodiment 2 provides the method of Embodiment 1, wherein the composition comprising terbium(III,IV) oxide is about 0.01 wt % to about 99.999 wt % terbium(III,IV) oxide.

Embodiment 3 provides the method of any one of Embodiments 1-2, wherein the separated terbium(III,IV) oxide is about 50 wt % to about 99.999 wt % terbium(III,IV) oxide.

Embodiment 4 provides the method of any one of Embodiments 1-3, wherein the contacting comprises heating the mixture.

Embodiment 5 provides the method of Embodiment 4, wherein the heating comprises heating the mixture to a heated temperature of about 30° C. to about 2000° C.

Embodiment 6 provides the method of any one of Embodiments 4-5, wherein the heating comprises heating the mixture to a heated temperature about 100° C. to about 200° C.

Embodiment 7 provides the method of any one of Embodiments 5-6, wherein the heating comprises maintaining the heated temperature of the mixture.

Embodiment 8 provides the method of Embodiment 7, wherein the heating comprises maintaining the heated temperature of the mixture for about 0.001 s to about 10 days.

Embodiment 9 provides the method of any one of Embodiments 7-8, wherein the heating comprises maintaining the heated temperature of the mixture for about 0.1 s to about 10 min.

Embodiment 10 provides the method of any one of Embodiments 7-9, wherein after the maintaining the method comprises cooling the mixture.

Embodiment 11 provides the method of any one of Embodiments 7-10, wherein the heating and maintaining are performed more than once.

Embodiment 12 provides the method of any one of Embodiments 4-11, wherein the heating comprises heating the mixture at a pressure of about 100 kPa to about 50 MPa.

Embodiment 13 provides the method of any one of Embodiments 4-12, wherein the heating comprises heating the mixture at about atmospheric pressure.

Embodiment 14 provides the method of any one of Embodiments 4-13, wherein the heating comprises heating the mixture with microwaves.

Embodiment 15 provides the method of Embodiment 14, wherein the microwaves comprise about 0.001 W to about 100,000,000 W.

Embodiment 16 provides the method of any one of Embodiments 14-15, wherein the microwaves comprise about 50 W to about 200 W.

Embodiment 17 provides the method of any one of Embodiments 14-16, wherein the microwaves comprise about 0.001 W to about 100,000,000 W per mL of the liquid comprising acetic acid.

Embodiment 18 provides the method of any one of Embodiments 14-17, wherein the microwaves comprise about 50 W to about 200 W per mL of the liquid comprising acetic acid.

Embodiment 19 provides the method of any one of Embodiments 1-18, wherein the liquid comprising acetic acid is about 0.01 vol % to about 100 vol % acetic acid.

Embodiment 20 provides the method of any one of Embodiments 1-19, wherein the liquid comprising acetic acid is about 10 vol % to about 30 vol % acetic acid.

Embodiment 21 provides the method of any one of Embodiments 1-20, wherein the liquid comprising acetic acid is an aqueous liquid.

Embodiment 22 provides the method of any one of Embodiments 1-21, wherein separating the undissolved terbium(III,IV) oxide from the mixture comprises removing at least some of the liquid having at least some of the one or more other trivalent rare earth oxides therein from the undissolved terbium(III,IV) oxide.

Embodiment 23 provides the method of any one of Embodiments 1-22, wherein separating the undissolved terbium(III,IV) oxide from the mixture comprises washing the undissolved terbium(III,IV) oxide with an aqueous composition.

Embodiment 24 provides the method of any one of Embodiments 1-23, wherein separating the undissolved terbium(III,IV) oxide from the mixture comprises drying the undissolved terbium(III,IV) oxide.

Embodiment 25 provides the method of any one of Embodiments 1-24, wherein the one or more other trivalent rare earth oxides comprise yttrium oxide ($Y_2O_3$), praseodymium oxide ($Pr_2O_3$), neodymium oxide ($Nd_2O_3$), samarium oxide ($Sm_2O_3$), europium oxide ($Eu_2O_3$), gadolinium oxide ($Gd_2O_3$), holmium oxide ($Ho_2O_3$), erbium oxide ($Er_2O_3$), ytterbium oxide ($Yb_2O_3$), lutetium oxide ($Lu_2O_3$), scandium oxide ($Sc_2O_3$), thulium oxide ($Tm_2O_3$), dysprosium oxide ($Dy_2O_3$), lanthanum oxide ($La_2O_3$), cerium oxide ($Ce_2O_3$), terbium oxide ($Tb_2O_3$), or a combination thereof.

Embodiment 26 provides the method of any one of Embodiments 1-25, wherein the one or more other trivalent rare earth oxides comprise dysprosium oxide ($Dy_2O_3$), lanthanum oxide ($La_2O_3$), gadolinium oxide ($Gd_2O_3$), or a combination thereof.

Embodiment 27 provides the method of any one of Embodiments 1-26, wherein the composition comprising terbium(III,IV) oxide has a particle size of about 1 nm to about 100 mm.

Embodiment 28 provides the method of any one of Embodiments 1-27, wherein the composition comprising terbium(III,IV) oxide has a particle size of about 50 nm to about 500 nm.

Embodiment 29 provides the method of any one of Embodiments 1-28, wherein the separated terbium(III,IV) oxide is about 0.01 wt % to about 100 wt % terbium(III,IV) oxide.

Embodiment 30 provides the method of any one of Embodiments 1-29, wherein the separated terbium(III,IV) oxide is about 90 wt % to about 99.999 wt % terbium(III,IV) oxide.

Embodiment 31 provides the method of any one of Embodiments 1-30, wherein the yield of the separated terbium(III,IV) oxide, based on the total amount of the terbium(III,IV) oxide in the composition comprising terbium(III,IV) oxide, is about 1% to about 100%.

Embodiment 32 provides the method of any one of Embodiments 1-31, wherein the yield of the separated terbium(III,IV) oxide, based on the total amount of the terbium(III,IV) oxide in the composition comprising terbium(III,IV) oxide, is about 50% to about 90%.

Embodiment 33 provides the method of any one of Embodiments 1-32, further comprising forming the composition comprising terbium(III,IV) oxide from a starting material comprising terbium, at least one compound comprising terbium, or a combination thereof.

Embodiment 34 provides the method of Embodiment 33, wherein the starting material comprises terbium(III,IV) oxide.

Embodiment 35 provides the method of any one of Embodiments 33-34, wherein the starting material comprises ore comprising at least one compound comprising terbium.

Embodiment 36 provides the method of Embodiment 35, wherein the ore comprises monazite, xenotime, euxenite, ion-adsorption clay, bastnasite, or a combination thereof.

Embodiment 37 provides the method of any one of Embodiments 33-36, wherein the starting material comprises a Tb-containing fuel cell, a Tb-containing solid-state device, a Tb-containing actuator, a Tb-containing sonar system, a Tb-containing sensor, a Tb-containing magneto-mechanical device, a Tb-containing fluorescent lamp bulb, a Tb-containing TV tube, a Tb-containing biochemical probe, a Tb-containing catalyst, one or more Tb-containing components thereof, or a combination thereof.

Embodiment 38 provides the method of any one of Embodiments 33-37, wherein the starting material comprises yttrium oxide ($Y_2O_3$), praseodymium oxide ($Pr_2O_3$), neodymium oxide ($Nd_2O_3$), samarium oxide ($Sm_2O_3$), europium oxide ($Eu_2O_3$), gadolinium oxide ($Gd_2O_3$), holmium oxide ($Ho_2O_3$), erbium oxide ($Er_2O_3$), ytterbium oxide ($Yb_2O_3$), lutetium oxide ($Lu_2O_3$), scandium oxide ($Sc_2O_3$), thulium oxide ($Tm_2O_3$), dysprosium oxide ($Dy_2O_3$), lanthanum oxide ($La_2O_3$), cerium oxide ($Ce_2O_3$), terbium oxide ($Tb_2O_3$), cerium oxide ($CeO_2$), praseodymium oxide ($Pr_6O_{11}$), thorium(IV) oxide ($ThO_2$), terbium(IV) oxide ($TbO_2$), terbium fluoride ($TbF_2$), terbium fluoride ($TbF_3$), terbium fluoride ($TbF_4$), terbium bromide ($TbBr_3$), terbium chloride ($TbCl_3$), terbium iodide ($TbI_3$), terbium silicide ($TbSi_2$), terbium oxide ($Tb_4O_7$), terbium sulfide ($Tb_2S_3$), terbium selenide ($Tb_2Se_3$), terbium hydride ($TbH_2$), terbium boride ($TbB_2$), terbium telluride (TbTe), terbium nitride (TbN), terbium carbonate ($Tb_2(CO_3)_3$), monazite, xenotime, euxenite, ion-adsorption clay, bastnasite, $Tb_xDy_{1-x}Fe_{1.95}$ (x=about 0.1 to about 0.5), $Y_2O_3:Eu^{3+}$ (YOX), $LaPO_4:Ce^{3+}$, $Tb^{3+}$ (LAP), $(Gd,Mg)B_5O_{12}:Ce^{3+},Tb^{3+}$ (CBT), (Ce,Tb)$MgA_{11}O_{19}$ (CAT), $BaMgAl_{10}O_{17}:Eu^{2+}$ (BAM), $(Sr,Ca,Ba,Mg)_5(PO_4)_3Cl:Eu^{2+}$, a Tb-containing alloy, a Tb-doped $CaF_2$, a Tb-doped $CaWO_4$, a Tb-doped strontium molybdate, sodium terbium borate, a hydrate thereof, or a combination thereof.

Embodiment 39 provides the method of any one of Embodiments 1-38, wherein forming the composition comprises processing the starting material.

Embodiment 40 provides the method of Embodiment 39, wherein the processing comprises roasting, grinding, crushing, chemically extracting, solvent extracting, floatation separating, forming compounds or salts of lanthanides, calcining, thermally decomposing, or any combination thereof.

Embodiment 41 provides the method of Embodiment 40, wherein forming compounds or salts of lanthanides comprises forming compounds or salts of terbium.

Embodiment 42 provides the method of any one of Embodiments 40-41, wherein forming compounds or salts of lanthanides comprises precipitating the compounds or salts of lanthanides.

Embodiment 43 provides the method of any one of Embodiments 40-42, wherein forming compounds of salts or lanthanides comprises forming oxalates, hydroxides, or combinations thereof, of lanthanides.

Embodiment 44 provides the method of any one of Embodiments 39-43, wherein the processing comprises at least partially removing at least some of one or more tetravalent lanthanide compounds from the starting material.

Embodiment 45 provides the method of any one of Embodiments 39-44, wherein the one or more tetravalent lanthanide compounds are chosen from cerium(IV) oxide ($CeO_2$), praseodymium(III,IV) oxide ($Pr_6O_{11}$), thorium(IV) oxide ($ThO_2$), terbium(IV) oxide ($ThO_2$), or a combination thereof.

Embodiment 46 provides the method of any one of Embodiments 44-45, wherein the removing of at least some of the one or more tetravalent lanthanide compounds from the starting material comprises chemically extracting, solvent extracting, floatation separating, precipitating compounds or salts of tetravalent lanthanides, or a combination thereof.

Embodiment 47 provides the method of any one of Embodiments 33-46, wherein forming the composition comprising terbium(III,IV) oxide comprises:

processing ore comprising crushing, grinding, froth flotation, or a combination thereof;

separating at least some tetravalent lanthanide oxides comprising chemical separation, solvent extraction, or a combination thereof;

precipitating oxalates, hydroxides, or a combination thereof, of remaining lanthanides; and thermally decomposing the precipitated compounds to provide corresponding lanthanide oxides.

Embodiment 48 provides the method of any one of Embodiments 33-47, wherein forming the composition comprising terbium(III,IV) oxide comprises:

roasting scrap comprising $Tb_xDy_{1-x}Fe_{1.95}$ (x=about 0.1 to about 0.5);

dissolving the roasting product in a liquid comprising acid;

precipitating oxalates of Dy and Tb from the liquid to provide a precipitate;

separating the precipitate from at least some of the Fe; and thermally converting the precipitate to a product comprising $Tb_4O_7$ and $Dy_2O_3$, to provide the composition comprising terbium(III,IV) oxide.

Embodiment 49 provides the method of any one of Embodiments 33-48, wherein forming the composition comprising terbium(III,IV) oxide comprises:

flotation separating phosphors comprising $Y_2O_3:Eu^{3+}$, $LaPO_4:Ce^{3+},Tb^{3+}$, and $(Sr,Ca,Ba,Mg)_5(PO_4)_3Cl:Eu^{2+}$, to provide separated $LaPO_4:Ce^{3+},Tb^{3+}$;

treating the separated $LaPO_4:Ce^{3+},Tb^{3+}$ with a base and removing produced $Na_3PO_4$, to provide hydrated oxides;

roasting the hydrated oxides;

extracting the roasted hydrated oxides with a liquid comprising acid;

separating insoluble $CeO_2$ from the liquid comprising acid;

precipitating oxalates of Tb and La from the liquid comprising acid to provide a precipitate; and thermally converting the precipitate to a product comprising $Tb_4O_7$ and $La_2O_3$, to provide the composition comprising terbium(III,IV) oxide.

Embodiment 50 provides a method of separating terbium (III,IV) oxide from a composition, the method comprising:

contacting a composition comprising terbium(III,IV) oxide and one or more other trivalent rare earth oxides, the composition having a particle size of about 50 nm to about 500 nm, with a liquid comprising at least about 10 vol % acetic acid to form a mixture;

heating the mixture, wherein the contacting and heating is effective to dissolve at least some of the one or more other trivalent rare earth oxides into the liquid; and separating undissolved terbium(III,IV) oxide from the mixture, to provide separated terbium(III,IV) oxide, wherein the yield of the separated terbium(III,IV) oxide, based on the total amount of the terbium(III,IV) oxide in the composition comprising terbium(III,IV) oxide, is about 50% to about 90%.

Embodiment 51 provides the method of any one or any combination of Embodiments 1-50 optionally configured such that all elements or options recited are available to use or select from.

What is claimed is:

1. A method of separating terbium(III,IV) oxide from a composition, the method comprising:
    contacting a composition comprising terbium(III,IV) oxide and one or more other trivalent rare earth oxides with a liquid comprising acetic acid to form a mixture, wherein the contacting is effective to dissolve at least some of the one or more other trivalent rare earth oxides into the liquid, the one or more other trivalent rare earth oxides comprising yttrium oxide ($Y_2O_3$), praseodymium oxide ($Pr_2O_3$), neodymium oxide ($Nd_2O_3$), samarium oxide ($Sm_2O_3$), gadolinium oxide (Gd$_2$O$_3$), holmium oxide (Ho$_2$O$_3$), erbium oxide (Er$_2$O$_3$), ytterbium oxide (Yb$_2$O$_3$), lutetium oxide (Lu$_2$O$_3$), scandium oxide (Sc$_2$O$_3$), thulium oxide (Tm$_2$O$_3$), dysprosium oxide (Dy$_2$O$_3$), lanthanum oxide (La$_2$O$_3$), cerium oxide (Ce$_2$O$_3$), terbium oxide (Tb$_2$O$_3$), or a combination thereof; and separating undissolved terbium (III,IV) oxide from the mixture, to provide separated terbium (III,IV) oxide.

2. The method of claim 1, wherein the contacting comprises heating the mixture.

3. The method of claim 2, wherein the heating comprises heating the mixture to a heated temperature of about 30° C. to about 2000° C.

4. The method of claim 1, wherein the liquid comprising acetic acid is an aqueous liquid.

5. The method of claim 1, wherein separating the undissolved terbium(III,IV) oxide from the mixture comprises removing at least some of the liquid having at least some of the one or more other trivalent rare earth oxides therein from the undissolved terbium(III,IV) oxide.

6. The method of claim 1, wherein separating the undissolved terbium(III,IV) oxide from the mixture comprises washing the undissolved terbium(III,IV) oxide with an aqueous composition.

7. The method of claim 1, wherein separating the undissolved terbium(III,IV) oxide from the mixture comprises drying the undissolved terbium(III,IV) oxide.

8. The method of claim 1, wherein the one or more other trivalent rare earth oxides comprise dysprosium oxide (Dy$_2$O$_3$), lanthanum oxide (La$_2$O$_3$), gadolinium oxide (Gd$_2$O$_3$), or a combination thereof.

9. The method of claim 1, wherein the composition comprising terbium(III,IV) oxide has a particle size of about 1 nm to about 100 mm.

10. The method of claim 1, wherein the separated terbium (III,IV) oxide is about 0.01 wt % to about 100 wt % terbium(III,IV) oxide.

11. The method of claim 1, wherein the yield of the separated terbium(III,IV) oxide, based on the total amount of the terbium(III,IV) oxide in the composition comprising terbium(III,IV) oxide, is about 1% to about 100%.

12. The method of claim 1, further comprising forming the composition comprising terbium(III,IV) oxide from a starting material comprising terbium, at least one compound comprising terbium, or a combination thereof.

13. The method of claim 12, wherein the starting material comprises terbium(III,IV) oxide.

14. The method of claim 12, wherein the starting material comprises a Tb-containing fuel cell, a Tb-containing solid-state device, a Tb-containing actuator, a Tb-containing sonar system, a Tb-containing sensor, a Tb-containing magneto-mechanical device, a Tb-containing fluorescent lamp bulb, a Tb-containing TV tube, a Tb-containing biochemical probe, a Tb-containing catalyst, one or more Tb-containing components thereof, or a combination thereof.

15. The method of claim 12, wherein the starting material comprises yttrium oxide (Y$_2$O$_3$), praseodymium oxide (Pr$_2$O$_3$), neodymium oxide (Nd$_2$O$_3$), samarium oxide (Sm$_2$O$_3$), europium oxide (Eu$_2$O$_3$), gadolinium oxide (Gd$_2$O$_3$), holmium oxide (Ho$_2$O$_3$), erbium oxide (Er$_2$O$_3$), ytterbium oxide (Yb$_2$O$_3$), lutetium oxide (Lu$_2$O$_3$), scandium oxide (Sc$_2$O$_3$), thulium oxide (Tm$_2$O$_3$), dysprosium oxide (Dy$_2$O$_3$), lanthanum oxide (La$_2$O$_3$), cerium oxide (Ce$_2$O$_3$), terbium oxide (Tb$_2$O$_3$), cerium oxide (CeO$_2$), praseodymium oxide (Pr$_6$O$_{11}$), thorium(IV) oxide (ThO$_2$), terbium (IV) oxide (TbO$_2$), terbium fluoride (TbF$_2$), terbium fluoride (TbF$_3$), terbium fluoride (TbF$_4$), terbium bromide (TbBr$_3$), terbium chloride (TbCl$_3$), terbium iodide (TbI$_3$), terbium silicide (TbSi$_2$), terbium oxide (Tb$_4$O$_7$), terbium sulfide (Tb$_2$S$_3$), terbium selenide (Tb$_2$Se$_3$), terbium hydride (TbH$_2$), terbium boride (ThB$_2$), terbium telluride (TbTe), terbium nitride (TbN), terbium carbonate (Tb$_2$(CO$_3$)$_3$), monazite, xenotime, euxenite, ion-adsorption clay, bastnasite, Tb$_x$Dy$_{1-x}$Fe (x=about$_2$O$_3$:Eu$^{3+}$ (YOX), LaPO$_4$:Ce$^{3+}$, Tb$^{3+}$ (LAP), (Gd,Mg)B$_5$O$_{12}$:Ce$^{3+}$,Tb$^{3+}$ (CBT), (Ce,Tb)MgA$_{11}$O$_{19}$ (CAT), BaMgAl$_{10}$O$_{17}$:Eu$^{2+}$ (BAM), (Sr,Ca,Ba,Mg)$_5$(PO$_4$)$_3$Cl:Eu$^{2+}$, a Tb-containing alloy, a Tb-doped CaF$_2$, a Tb-doped CaWO$_4$, a Tb-doped strontium molybdate, sodium terbium borate, a hydrate thereof, or a combination thereof.

16. The method of claim 12, wherein forming the composition comprising terbium(III,IV) oxide comprises:

processing ore comprising crushing, grinding, froth flotation, or a combination thereof;

separating at least some tetravalent lanthanide oxides comprising chemical separation, solvent extraction, or a combination thereof;

precipitating oxalates, hydroxides, or a combination thereof, of remaining lanthanides; and thermally decomposing the precipitated compounds to provide corresponding lanthanide oxides.

17. A method of separating terbium (III,IV) oxide from a composition, the method comprising:

roasting scrap comprising Tb$_x$Dy$_{1-x}$Fe (x=about 0.1 to about 0.5);

dissolving the roasting product in a liquid comprising acid;

precipitating oxalates of Dy and Tb from the liquid to provide a precipitate;

separating the precipitate from at least some of the Fe;

thermally converting the precipitate to a product comprising Tb$_4$O$_7$ and Dy$_2$O$_3$, to provide a composition comprising terbium(III,IV) oxide;

contacting the composition comprising terbium(III,IV) oxide and one or more other trivalent rare earth oxides with a liquid comprising acetic acid to form a mixture, wherein the contacting is effective to dissolve at least some of the one or more other trivalent rare earth oxides into the liquid; and separating undissolved terbium (III,IV) oxide from the mixture, to provide separated terbium (III,IV) oxide.

18. A method of separating terbium(III,IV) oxide from a composition, the method comprising:

flotation separating phosphors comprising Y$_2$O$_3$:Eu$^{3+}$, LaPO$_4$:Ce$^{3+}$,Tb$^{3+}$, and (Sr,Ca,Ba,Mg)$_5$(PO$_4$)$_3$Cl:Eu$^{2+}$, to provide separated LaPO$_4$:Ce$^{3+}$,Tb$^{3+}$;

treating the separated LaPO$_4$:Ce$^{3+}$,Tb$^{3+}$ with a base and removing produced PO$_4^{3-}$ salts, to provide hydrated oxides;

roasting the hydrated oxides;

extracting the roasted hydrated oxides with a liquid comprising acid;

separating insoluble CeO$_2$ from the liquid comprising acid;

precipitating oxalates of Tb and La from the liquid comprising acid to provide a precipitate;

thermally converting the precipitate to a product comprising Tb$_4$O$_7$ and La$_2$O$_3$, to provide a composition comprising terbium(III,IV) oxide;

contacting the composition comprising terbium(III,IV) oxide and one or more other trivalent rare earth oxides with a liquid comprising acetic acid to form a mixture, wherein the contacting is effective to dissolve at least some of the one or more other trivalent rare earth oxides into the liquid; and separating undissolved terbium (III,IV) oxide from the mixture, to provide separated terbium (III,IV) oxide.

19. The method of claim 1, wherein:

the composition comprising terbium(III,IV) oxide and one or more other trivalent rare earth oxides has a particle size of about 50 nm to about 500 nm, the liquid comprising acetic acid comprises at least about 10 vol % acetic acid, and yield of the separated terbium(III,IV) oxide, based on the total amount of the terbium(III,IV) oxide in the composition comprising terbium(III,IV) oxide, is about 50% to about 90%.

20. A method of separating terbium(III,IV) oxide from a composition, the method comprising:

precipitating oxalates, hydroxides, or a combination thereof, of Tb and of one or more other trivalent rare earth metals from a liquid comprising acid;

thermally decomposing the precipitated oxalates or hydroxides to the corresponding oxides, to provide a composition comprising oxides of terbium(III,IV) and of at least some of the one or more other trivalent rare earth metals;

contacting the composition comprising terbium(III,IV) oxide and one or more other trivalent rare earth oxides with a liquid comprising acetic acid to form a mixture, wherein the contacting is effective to dissolve at least some of the one or more other trivalent rare earth oxides into the liquid; and separating undissolved terbium (III,IV) oxide from the mixture, to provide separated terbium (III,IV) oxide.

* * * * *